(12) United States Patent
Potnis et al.

(10) Patent No.: US 7,882,386 B1
(45) Date of Patent: Feb. 1, 2011

(54) SYSTEM AND METHOD FOR RECOVERING A LOGICAL VOLUME DURING FAILOVER OR REBOOT OF A FILE SERVER IN A DATA STORAGE ENVIRONMENT

(75) Inventors: Ajay S. Potnis, Maharashtra (IN); Jean-Pierre Bono, Westborough, MA (US); Sairam Veeraswamy, South Grafton, MA (US); Rahul Bhagwat, Maharashtra (IN)

(73) Assignee: EMC Corporaton, Hopkinton, MA (US)

( * ) Notice: Subject to any disclaimer, the term of this patent is extended or adjusted under 35 U.S.C. 154(b) by 407 days.

(21) Appl. No.: 12/052,907

(22) Filed: Mar. 21, 2008

(51) Int. Cl.
*G06F 11/00* (2006.01)
(52) U.S. Cl. .................. 714/2; 714/6; 714/42
(58) Field of Classification Search .............. 714/2, 714/6, 7, 8, 15, 42; 711/3, 13, 114, 119, 711/120, 121, 122, 129, 153, 202, 206
See application file for complete search history.

(56) References Cited

U.S. PATENT DOCUMENTS

| | | | |
|---|---|---|---|
| 7,263,578 B2 * | 8/2007 | Kano | 711/112 |
| 7,467,276 B1 * | 12/2008 | Kahn et al. | 711/166 |
| 7,536,529 B1 * | 5/2009 | Chatterjee et al. | 711/202 |
| 7,689,766 B1 * | 3/2010 | Chatterjee et al. | 711/113 |
| 2007/0174673 A1 * | 7/2007 | Kawaguchi et al. | 714/6 |
| 2007/0260842 A1 * | 11/2007 | Faibish et al. | 711/170 |
| 2008/0005468 A1 * | 1/2008 | Faibish et al. | 711/114 |
| 2008/0126734 A1 * | 5/2008 | Murase | 711/170 |
| 2008/0133967 A1 * | 6/2008 | Lee et al. | 714/6 |
| 2009/0144496 A1 * | 6/2009 | Kawaguchi | 711/114 |
| 2009/0216941 A1 * | 8/2009 | Delbosc et al. | 711/111 |

OTHER PUBLICATIONS

Geoffrey Hough Sr., 3PAR Thin Provisioing—Eliminating Allocated—But- Unused Storage and Acclerating ROI Jun. 2003 White Paper—pp. 9-11.*

* cited by examiner

*Primary Examiner*—Scott T Baderman
*Assistant Examiner*—Sarai Butler
(74) *Attorney, Agent, or Firm*—Krishnendu Kupta; Joseph D'Angelo

(57) ABSTRACT

This invention is a system and a method for recovering and repairing a logical volume in a data storage environment using a new architecture. The method of recovering a logical volume enables mounting of a file system by instantiating only a single slice under the sparse volume and instantiating rest of the slices provisioned under the sparse volume in background by a asynchronous recovery process or on-demand by the clients of the file system issuing an I/O on the slice volume. The method of repairing a logical volume provides the ability to regenerate the metadata required to reconstruct the corrupted volume.

21 Claims, 15 Drawing Sheets

SYSTEM AND METHOD FOR RECOVERING A LOGICAL VOLUME DURING FAILOVER OR REBOOT OF A FILE SERVER IN A DATA STORAGE ENVIRONMENT

FIELD OF THE INVENTION

This invention relates generally to accessing disk storage in a data storage environment, and more particularly to a system and a method for instantiating and reconstructing a logical volume during failover or reboot of a file server.

BACKGROUND OF THE INVENTION

Network data storage is typically provided by an array of disk drives integrated with large semiconductor cache memory. A file server is used to interface the cached disk array to the network. The file server performs mapping of a network files to logical block addresses of storage in the cached disk array and move data between a network clients and the storage in the cached disk array. The file server use a network block services protocol in a configuration process in order to export to the network client logical volumes of the network-attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference. Network clients typically use a network file system access protocol to access one or more file systems maintained by the file server.

In a data storage subsystem, the logical block addresses of storage are subdivided into a logical volumes. Each logical volume is mapped to the physical storage using a respective striping and redundancy scheme and is addressable by a file server independently of which physical volume is storing the logical volume. A sparse meta-volume is a thin provisioned logical volume used by a file system to store user data on one or more slice volumes. Each slice volume provisioned under the sparse meta-volume is mapped to a logical unit of storage.

The storage technology described above, in combination with a continuing increase in disk drive storage density, file server processing power, and network bandwidth at decreasing cost, has provided network clients with more than an adequate supply of network storage capacity at affordable prices. The vast amount of stored information on volumes is interfering with quick recovery of a sparse volume during failover or reset of a file server because time to mount or recover a volume increases linearly contributing significantly to the failover and boot latency. A File System could not be mounted unless all the slice volumes provisioned under the sparse meta-volume has been completely instantiated. Instantiation of a sparse meta-volume with a large number of slice volumes would take at least few seconds to instantiate. Mounting of a large number of sparse meta-volumes in turn would take at least few minutes. This creates high latency and low availability during failover or reset of a file server when a sparse volume needs to be recovered.

Additionally a volume can become inconsistent due to corruption. The clients of the file server have been denied access to the file system to which the inconsistent volume belongs. Reducing the time it takes to recover a sparse meta-volume would be advancement in the data storage computer-related arts. This is becoming increasingly important as the amount of information being handled and stored grows geometrically over short time periods and such environments add more file systems and data at a rapid pace.

SUMMARY OF THE INVENTION

To overcome the problems described above and to provide the advantages also described above, the present invention in one embodiment includes a method for recovering a sparse meta-volume during mount in a data storage environment consisting of a data storage system and a file server. The method includes instantiating a root slice that includes metadata of the slice volumes provisioned under the sparse volume. The method then instantiates the slice-0 of the root slice and invokes an asynchronous recovery program to instantiate other slice volumes provisioned under the sparse volume. The asynchronous recover program instantiates the slice volumes in background unless the slice volume has already been instantiated on-demand by an I/O issued on the slice volume by a client of the file server.

In another embodiment, a system for recovering a sparse volume includes a data storage system to provide logical disk storage to a file server and a file server. The file server accesses the logical disk storage through a sparse volume that includes plurality of slice volumes that logically represents the disk storage of a data storage system. The sparse volume includes a root slice volume comprising of a SliceMap array. The system includes program logic to carry out the steps of recovering a sparse volume by instantiating the root slice, slice-0 of the root slice and invoking an asynchronous recovery program to instantiate other slice volumes provisioned under the sparse volume.

In another embodiment method steps are carried out for reconstructing a sparse meta-volume such that the corrupted volume is repaired by examining metadata information contained in a slice database, a root slice of the sparse volume and a SliceMark field of a slice volume provisioned under the sparse volume.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in a data storage environment that include data storage systems, such as the Symmetrix Integrated Cache Disk Array system or the Clariion Disk Array system available from EMC Corporation of Hopkinton, Mass. and those provided by vendors other than EMC and a file server such as Celerra File Server, which is available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The embodiment of the present invention shortens the failover or reboot time of a file server by doing minimum recovery of a sparse volume. This provides the user of a data storage system an ability to access the file systems before all the slices provisioned under the sparse volume has been fully instantiated. For example, thousands of sparse volume can be instantiated in seconds as opposed to minutes and a file system can be mounted before complete instantiation of a sparse volume.

Figure 1:
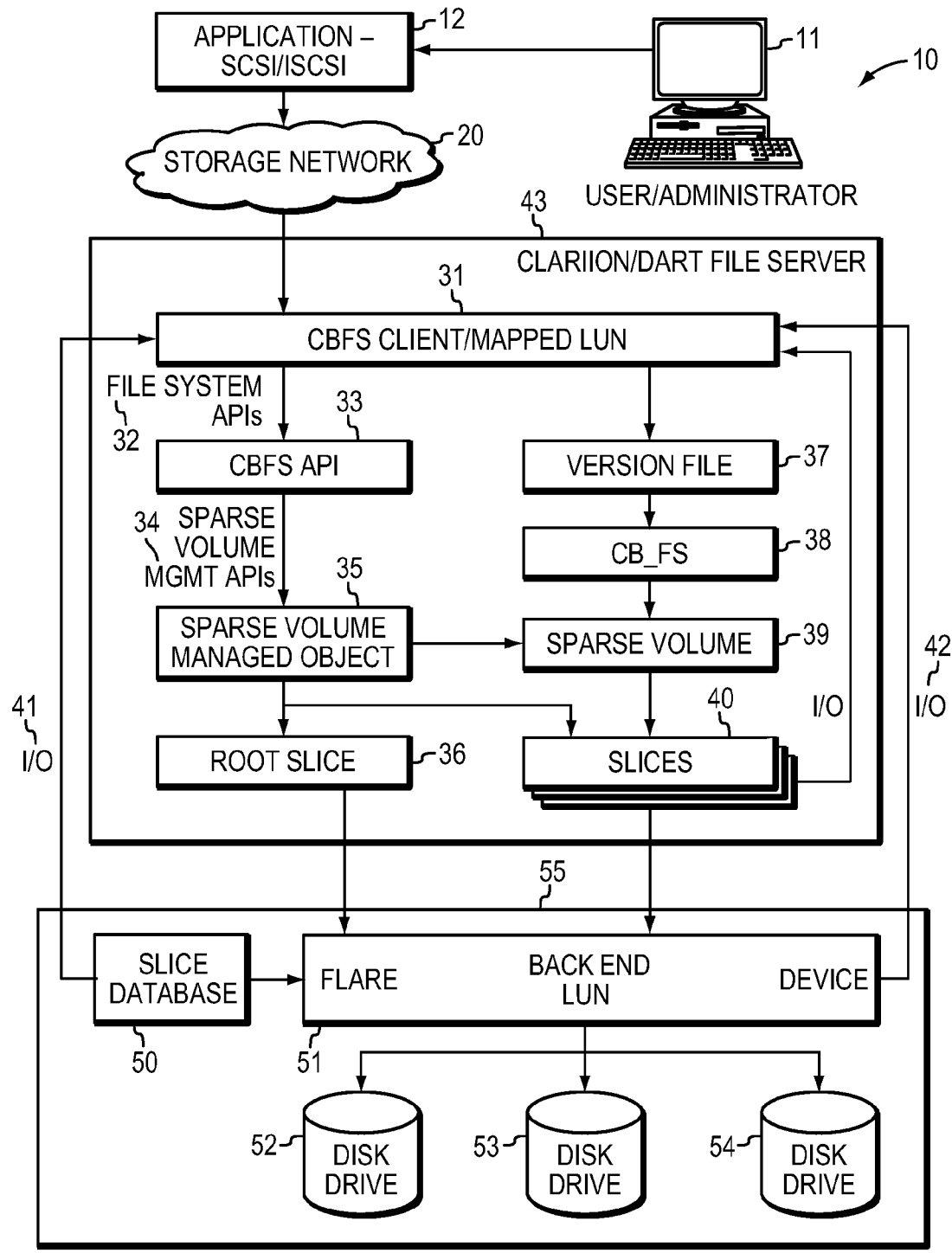
FIG. 1 is a block diagram showing a data storage environment including a new architecture embodying the present invention and which is useful in such an environment.

The new architecture also allows for quick fault detection and repair of a sparse volume by regenerating the metadata required to reconstruct a volume. Advantages provided include: (1) reduction of a file system downtime; (2) higher reliability, consistency and low latency in accessing the storage volumes; (3) increased fault tolerance by implementing ability to reconstruct a sparse volume; and (4) volume management that is non-disruptive to hosts and storage subsystems Architecture Referring now to FIG. 1, reference is now made to a data storage environment 10 including a file server 43 and a data storage subsystem 55. The data storage system includes disks or storage 52-54 mapped to Logical Unit of Storage (LUN) 51 that act as a virtual disks that are presented for access to hosts such as file server 43 for I/O operations. LUN's are also sometime referred to interchangeably with data volumes, which at a logical level represent physical storage. The data storage system further includes a slice database 50 that maintains the mapping of physical storage to the logical storage volumes. The network file server 43 is managed as a dedicated network accessible storage device, integrated with popular network operating systems in a way, which, other than its superior performance, is transparent to the end user. The file server 43 communicates with the data storage system 55 using an I/O path 41 for managing data and another I/O path 42 to for managing meta-data.

A file system further includes a sparse volume 39 which is a thin provisioned logical volume used by a version file 37 built on top of Container File System 38 and may be sparsely provisioned with a slices of logical storage 40 to store the user data, wherein the slices are mapped to the logical unit of storage (LUN) of the data storage system. The sparse volume uses a root slice 36 to store its meta-data related to the slices of storage provisioned under it.

The clients 11 may then use the applications 12 using the Internet Small Computer Systems Interface (iSCSI) protocol, Fiber Channel or any other network or storage device interconnect protocol through storage network 20 to access these logical volumes through the application layer named Mapped LUN 31, wherein the Mapped LUN layer interacts with the sparse volume managed object 35 through various APIs 32, 33, 34.

Figure 2:
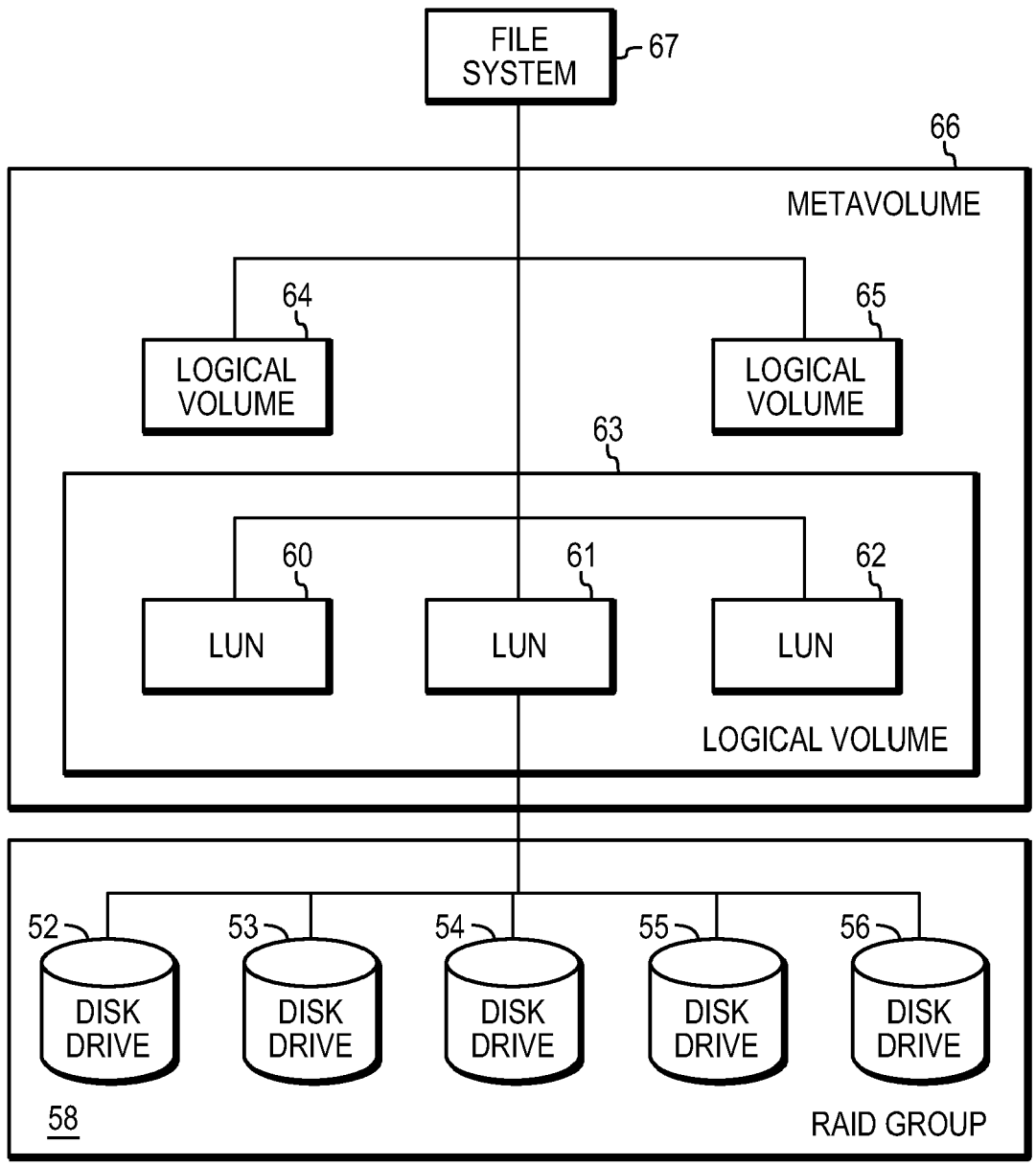
FIG. 2 is a block diagram showing a conventional organization of physical storage for one file system in a data storage environment shown in FIG. 1.

Reference is made to FIG. 2, showing a functional block diagram of conventional storage object hierarchy in a network file server. Disk drives 52, 53, 54, 55, and 56 are arranged in a group to form a redundant array of inexpensive disks (RAID) 58. The RAID group provides a logical unit number (LUN) of storage. A plurality of such LUNS 60, 61, and 62 are combined to form a logical volume 63 of storage having contiguous logical storage addresses. A plurality of such logical volumes 64 and 65 are combined to form a metavolume 66 of storage having contiguous logical storage addresses. One file system 67 is built upon the metavolume 66. The file system 67 is mounted and exported to a client via a file access protocol. A file system can only be mounted and exported after the metavolume on which it is built is instantiated completely. The inventors have critically recognized that prior art had limited information in the sparse metavolume to asynchronously instantiate the slices of storage provisioned under it. However, the present invention being based on a asynchronous recovery process and a multi-level CRC does not have such limitation.

Figure 3:
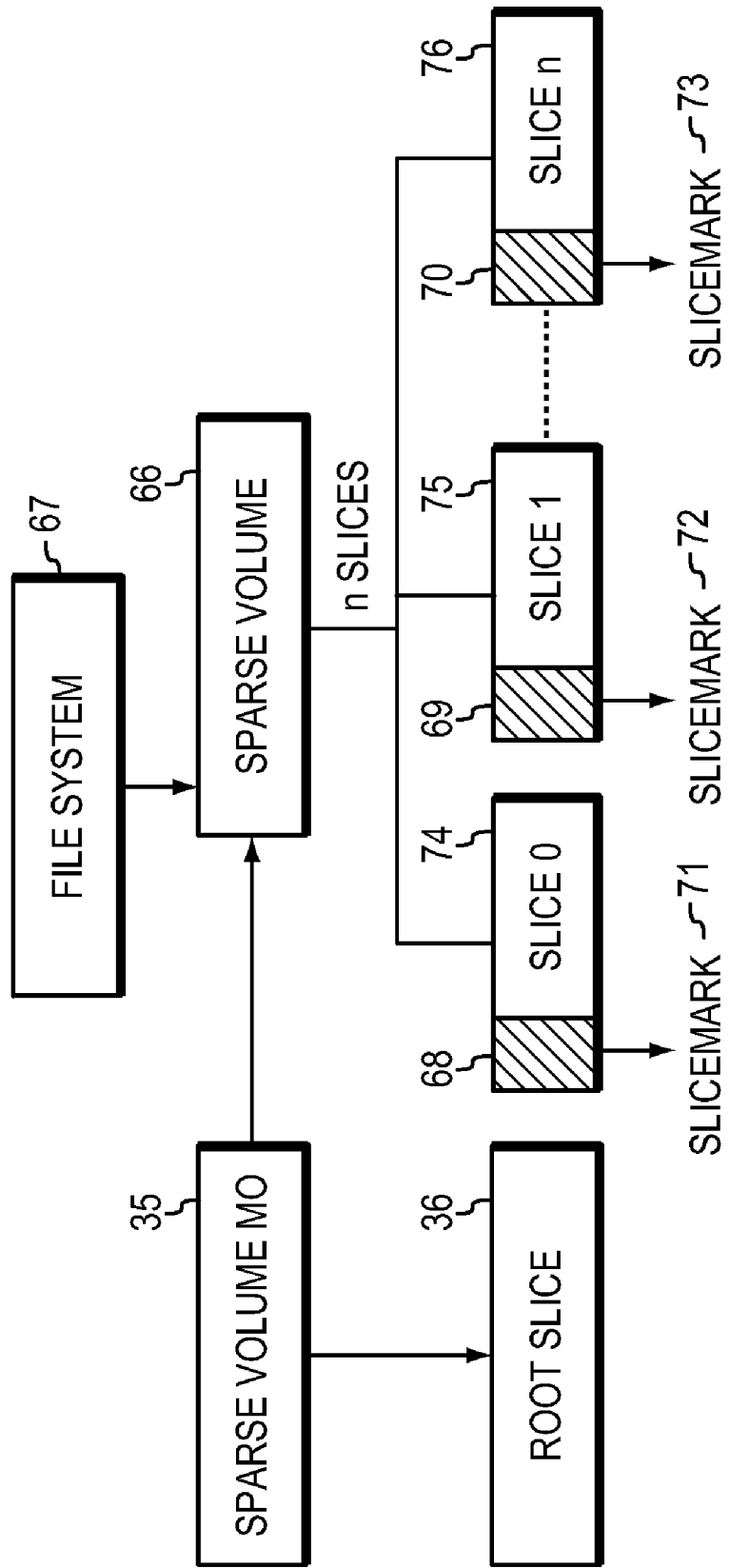
FIG. 3 is a block diagram showing a file server storage architecture including a root slice, sparse volume managed object and a specific mapping of a set of slices of the logical volume to a sparse meta-volume for one file system shown in FIG. 2.

Referring to FIG. 3, the sparse metavolume 66 has the ability to aggregate a plurality of N slices 68-70 of the same size of logical storage space together into a contiguous logical extent while some of these slices may or may not be provisioned. A slice-0 68 at an offset zero in the logical extent is always provisioned. Each provisioned slice has a corresponding configured storage slice object that is mapped to a corresponding LUN of physical storage. Each configured storage slice object 68, 69, 70 has a respective SliceMark 71, 72, 73 containing metadata and state information for the provisioned slice, and a respective area of storage 74, 75, 76 for containing slice data. For example, the SliceMark occupies the first two sectors (of 512 bytes per sector) of the provisioned LUN of physical storage, and the slice data occupies the remaining sectors of the provisioned LUN of physical storage.

An initial slice 68, referred to as slice-0, is used by the file system. In addition to the bookkeeping information like block utilization of the slice, quality of the service for the slice, the file system 67 uses the slice map stored under slice block 71 to verify the logical mapping of the underlying volume to ensure that the layout of the file system matches that of the sparse meta-volume 66. This metadata and management information includes a primary superblock, a SliceMap, and a relocatable inode file. The primary superblock includes metavolume metadata such as the size of the sparse multivolume and the constant size of each slice in the sparse metavolume 66. The SliceMap indicates whether or not any given slice of the sparse metavolume is provisioned, and if so, the slice identifier of the configured slice object is identified. The slice identifier identifies a slice of logical storage configured from the same kind of storage in the cached disk array. Thus, minimum recovery of the metavolume 66 is achieved by instantiating the slice-0 and recovering the other slices in background by a asynchronous recovery program. The root slice 36 contains the metadata of all the slices provisioned for the sparse volume 66 and is managed by a sparse volume managed object 35.

Figure 4:
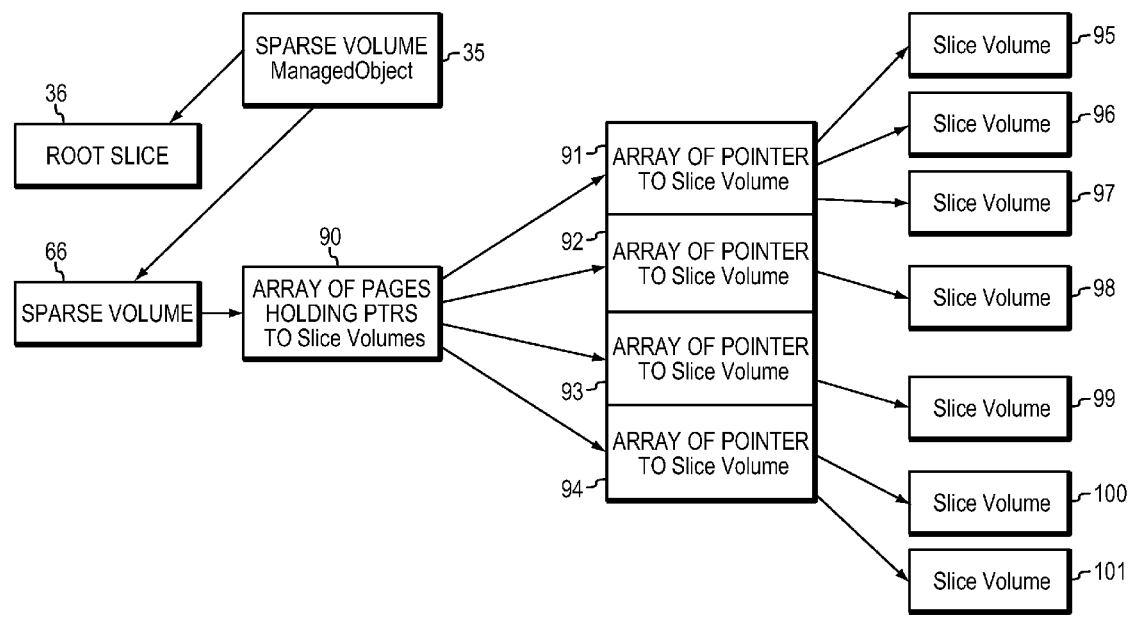
FIG. 4 is a block diagram of a in-core memory layout of a sparse volume.

FIG. 4 shows the in-memory representation of instantiated sparse volume 66 managed by sparse volume managed object 35. The sparse volume includes the array of memory pages 90, wherein in each memory page 91-94 includes the array of pointers that point to the instantiated slice volumes 95-101. This array based addressing of slices improves the I/O performance by quickly finding the underlying slice by adding size of underlying slices and then reaching to the desired offset. The root slice 36 is also managed by the sparse volume managed object 35 for every instantiated sparse volume 66.

Figure 5:
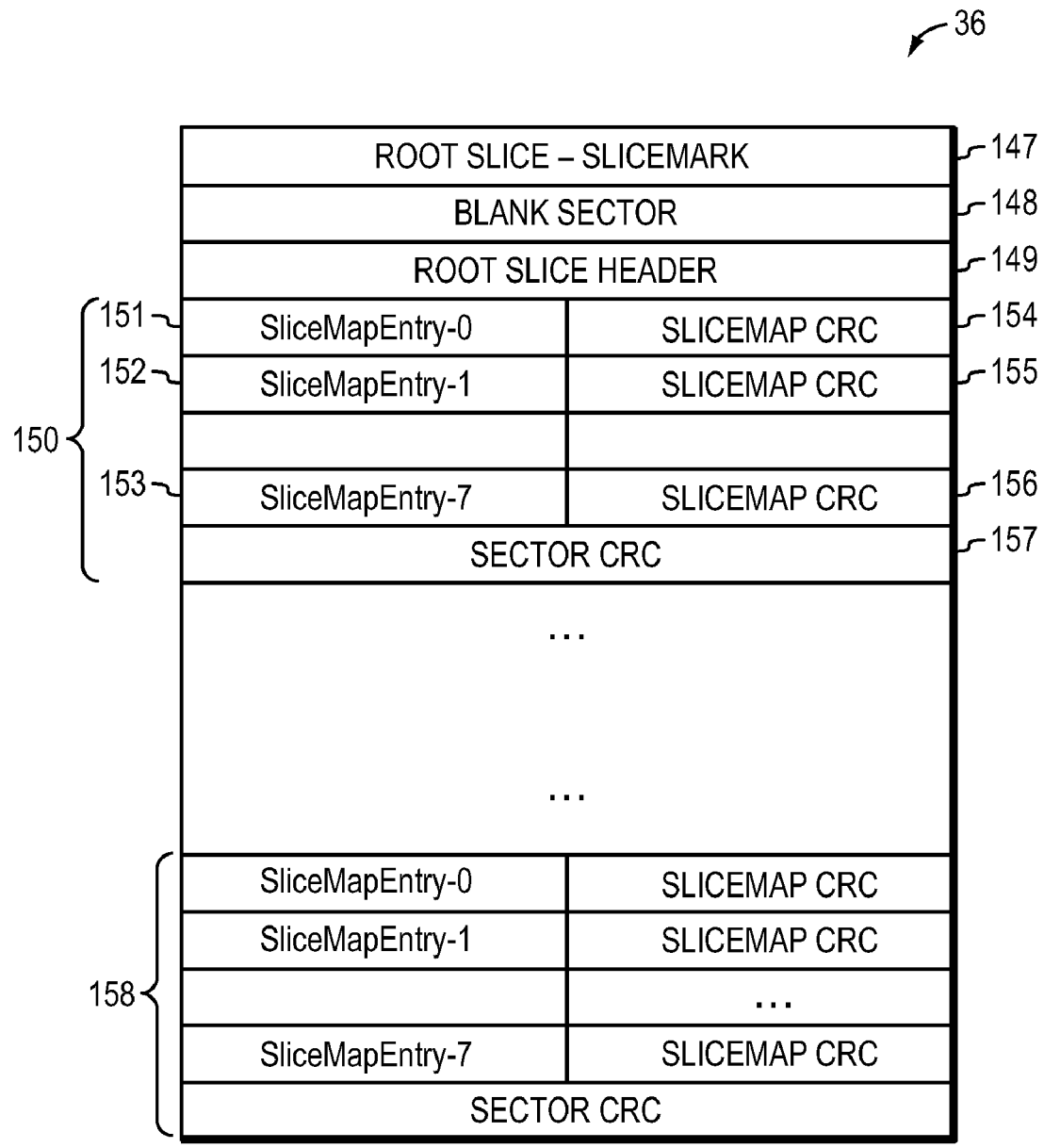
FIG. 5 is a block diagram showing the on-disk data structures layout for a root slice volume included in the FIG. 3.

Referring to FIG. 5, the root slice volume 36 is a special volume including an array of sectors 150, 158, wherein each sector includes a sector CRC 157 and an array of SliceMapEntry 151, 152, 153. Sector CRC 157 is updated when a slice is added or removed from the array of SliceMapEntry 151, 152, 153 belonging to that sector. This enables the fault containment logic to detect any inconsistency within the sector. Each SliceMapEntry included in the array of SliceMapEntry includes a SliceMap CRC 154, 155, 156 to avoid the SliceMapEntry being overwritten by some other volume. Root slice volume includes a SliceMark field 147 to protect the consistency of the root slice volume and a header field 149 that includes the metadata of the root slice volume. The root slice also includes a blank sector 148 to leverage the future fields.

Figure 6:
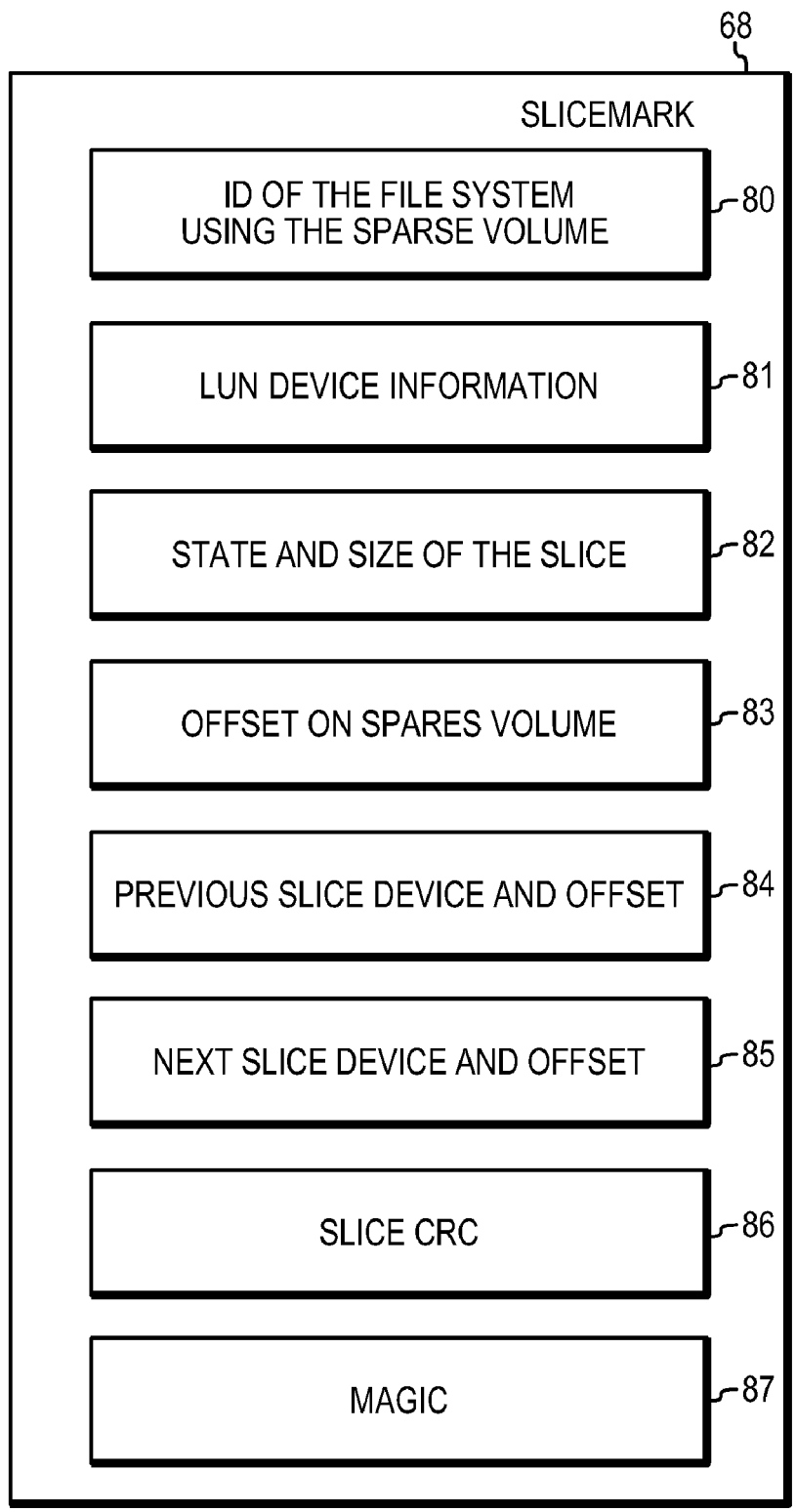
FIG. 6 is a block diagram of a SliceMark introduced in FIG. 3.

FIG. 6 shows the contents of the SliceMark 68. The SliceMark includes a slice ID 80 that identifies the slice object so that the slice object can be mapped to the logical extent of the sparse metavolume. The SliceMark field 81 also contains an identification (ID) number of the sparse metavolume or slice pool that owns the provisioned slice object. The SliceMark further includes a field 81 that stores the information so that the slice can be mapped to a LUN of physical storage in a data storage system. The SliceMark further includes a field 83 for containing the offset of the provisioned slice on the extent of the sparse metavolume when the slice is not free. The SliceMark 68 further includes the slice state 82. The SliceMark field 84 includes the information about the previous slice provisioned under the sparse metavolume and the SliceMark field 85 includes information about the next provisioned slice volume. These two field combined enable a slice volume to chain itself during the asynchronous recovery of a sparse metavolume. The SliceMark 68 further includes a slice CRC 86 to detect any inconsistencies or corruption in the slice volume. The SliceMark includes a magic field 87 to detect if the slice volume is in use and avoids the reuse of a slice volume.

The SliceMark included in every slice volume of configured storage is maintained during the lifecycle of the slice volume. The SliceMark is checked for consistency any time a slice is transitioned to a different state. On finding the inconsistencies between the state of the slice and its SliceMark, any further action on the slice volume is blocked and appropriate measures are taken immediately to prevent further damage to the system.

Figure 7:
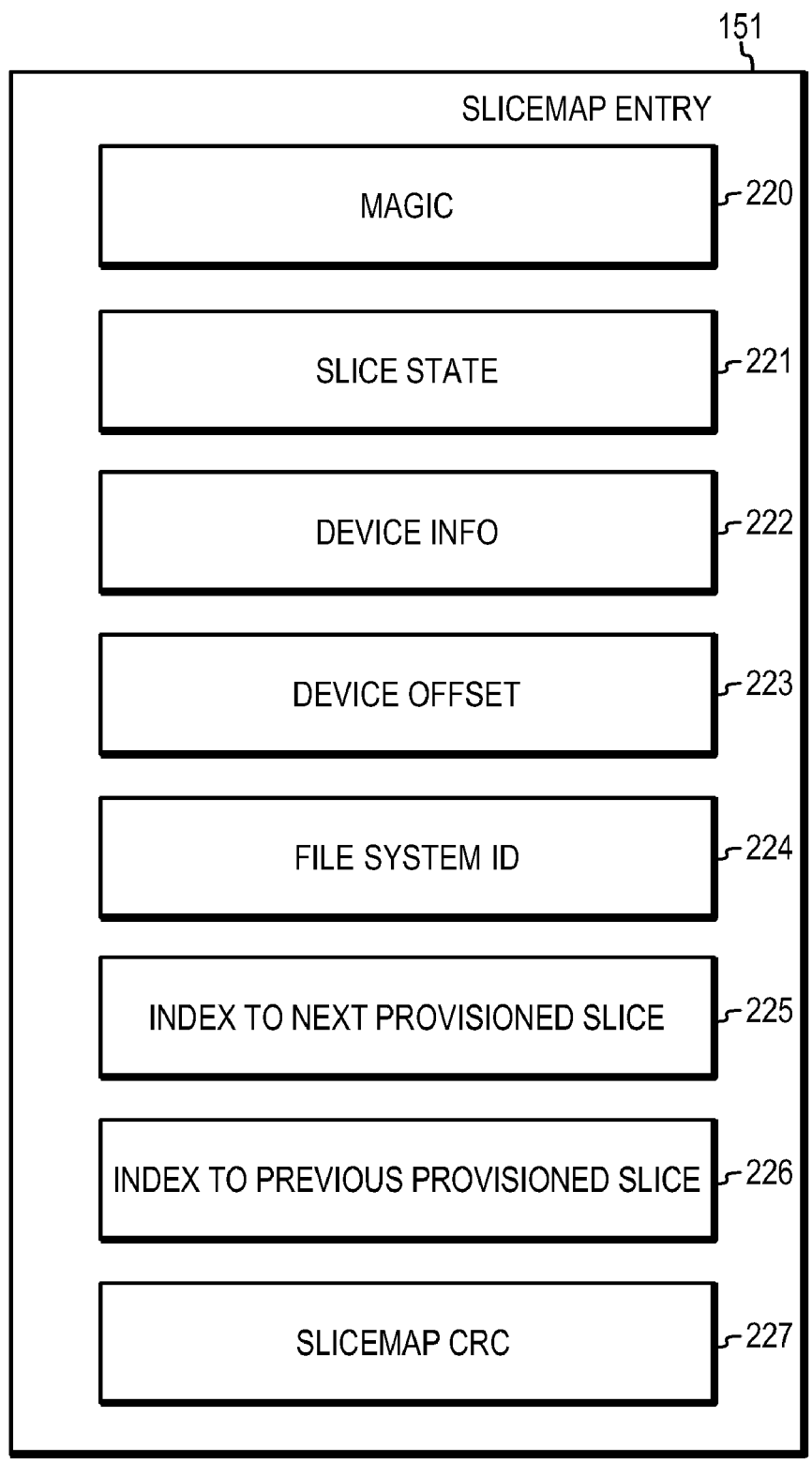
FIG. 7 is a block diagram of a SliceMapEntry introduced in FIG. 5.

FIG. 7 shows the contents of each SliceMapEntry. The SliceMapEntry field 151 includes the metadata 220-226 of the slice volume similar to the metadata included in the SliceMark field of FIG. 4. The information about the slice volume in the SliceMark field matches to the information included in the corresponding SliceMapEntry of the root slice volume. The SliceMap entry includes a magic field 220 to indicate if the slice volume indicated by the SliceMap entry is in use. Slice state field 221 maintains the state of the slice volume at a given point. The information of the LUN on which the slice volume is built is maintained in Device Info field 222. Offset within the LUN is maintained by field Device Offset 223. File System ID field 224 indicates the ID of the file system built on top of the sparse volume under which this slice volume is provisioned. The SliceMapEntry field further includes the index of next provisioned entry of slice volume 225 within the SliceMap. The SliceMapEntry field also includes the index of previous provisioned entry of slice volume 226 within the SliceMap that helps in chaining the slice volumes. The SliceMap further maintains the CRC 227 to protect the integrity of the SliceMap entry.

The fault containment logic uses the SliceMap for marking unstable slices inconsistent and preventing any subsequent access until the slice is repaired. The SliceMap is also used to ensure that the in-memory representation of the sparse metavolume matches the state of the sparse metavolume as indicated in the Slice Marks of the provisioned slices. Any inconsistency is repaired by reconstructing the sparse metavolume. Present invention also includes a Transaction Log framework that would be useful to protect a storage object's integrity in the event when system restart interrupts the multiple metadata updates performed on the storage object.

Figure 8:
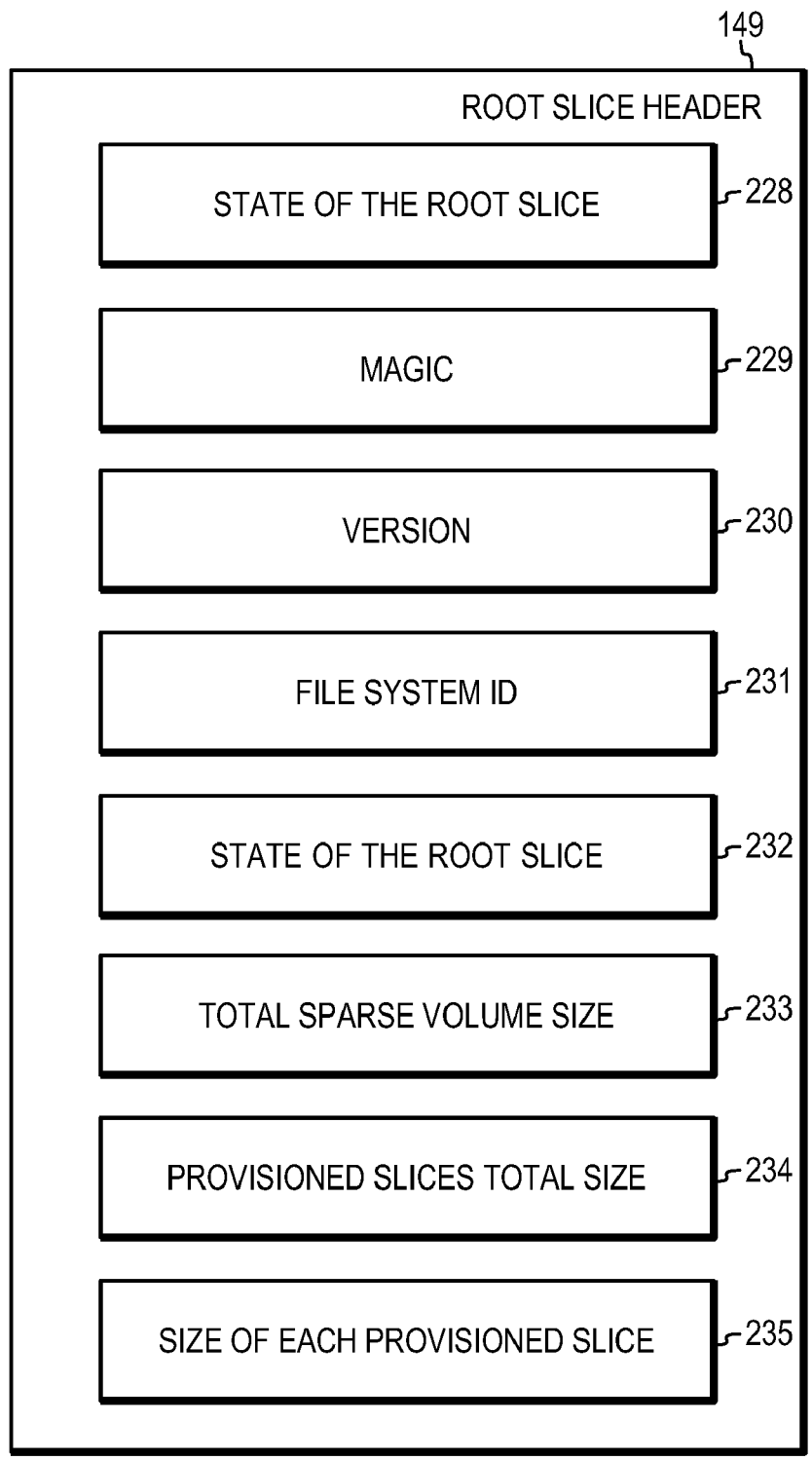
FIG. 8 is a block diagram of a root slice header introduced in FIG. 5.

FIG. 8 shows the content of a root slice header. The root slice header 149 includes state of the root slice 228 that indicates the root slice as free, created, ready, deleted and/or in inconsistent state. The header further includes a magic field 229 to indicate if the slice volume is of a root slice volume. The header includes a version 230 to indicate the version of the root slice and an id of the file system 231 to which the root slice belongs. The header also includes a state of the root slice 232, total sparse volume size 233, total size of the provisioned slices 234 and size of each provisioned slices 235.

Further Operation Details

Reference will be made below to FIGS. 9-12 to describe a problem solved with the architecture described above with reference to FIGS. 1-8; however, a general overview is now given. The inventors have critically recognized that mounting the file system after all the slice volumes belonging to a sparse volume on which file system is built does not scale in a data storage environment where user has mounted thousands of such file system. This approach further creates high latency in accessing the file systems and low availability of the storage data to the customers. Additionally on finding a corruption on a slice volume, the file system built on that volume would be unavailable to the user until the corruption is repaired. This approach again causes data unavailability to the customers for the time it takes to repair the corruption.

This problem is addressed with the architecture of the present invention by doing basic integrity checks and recovery of the sparse volume and making the file system available to the user. The asynchronous recovery program instantiates rest of the slice volume in the background or on-demand when a client of the file system issues the I/O on the slice volume. Additionally, the present invention makes the sparse volume self reliant by keeping the metadata of the provisioned slice volume in a logical volume named Root Slice. Further, the SliceMark field included in every slice volume ensures that the slice volume will be only be used for one sparse volume and reduces the chances of corruption. Moreover, 32 bit CRC is used for Data and MetaData Integrity. Present invention includes multiple level of CRC implementation to protect customer data from being corrupted. When a root slice volume is corrupted, a sparse volume can be reconstructed from the metadata included in the SliceMark field of the provisioned slice volumes.

Figure 9A:
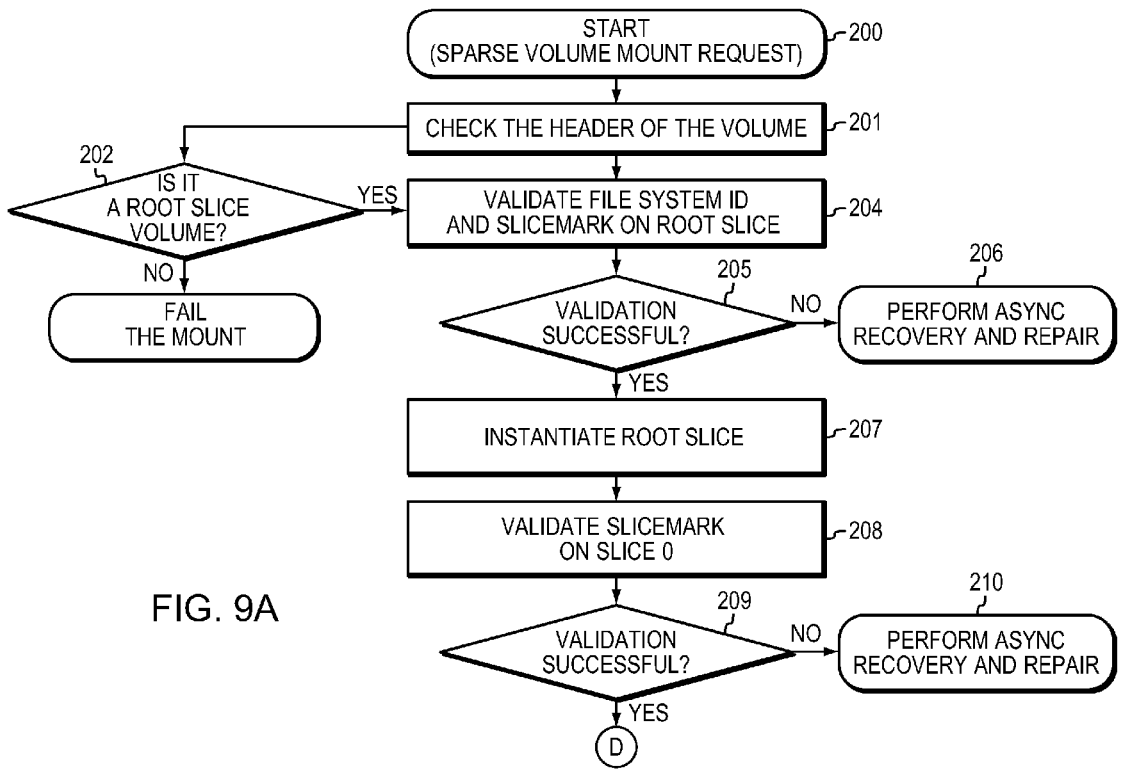
FIGS. 9A and 9B are flow logic diagrams illustrating a method of mounting a sparse volume shown in the FIG. 3.
Figure 9B:
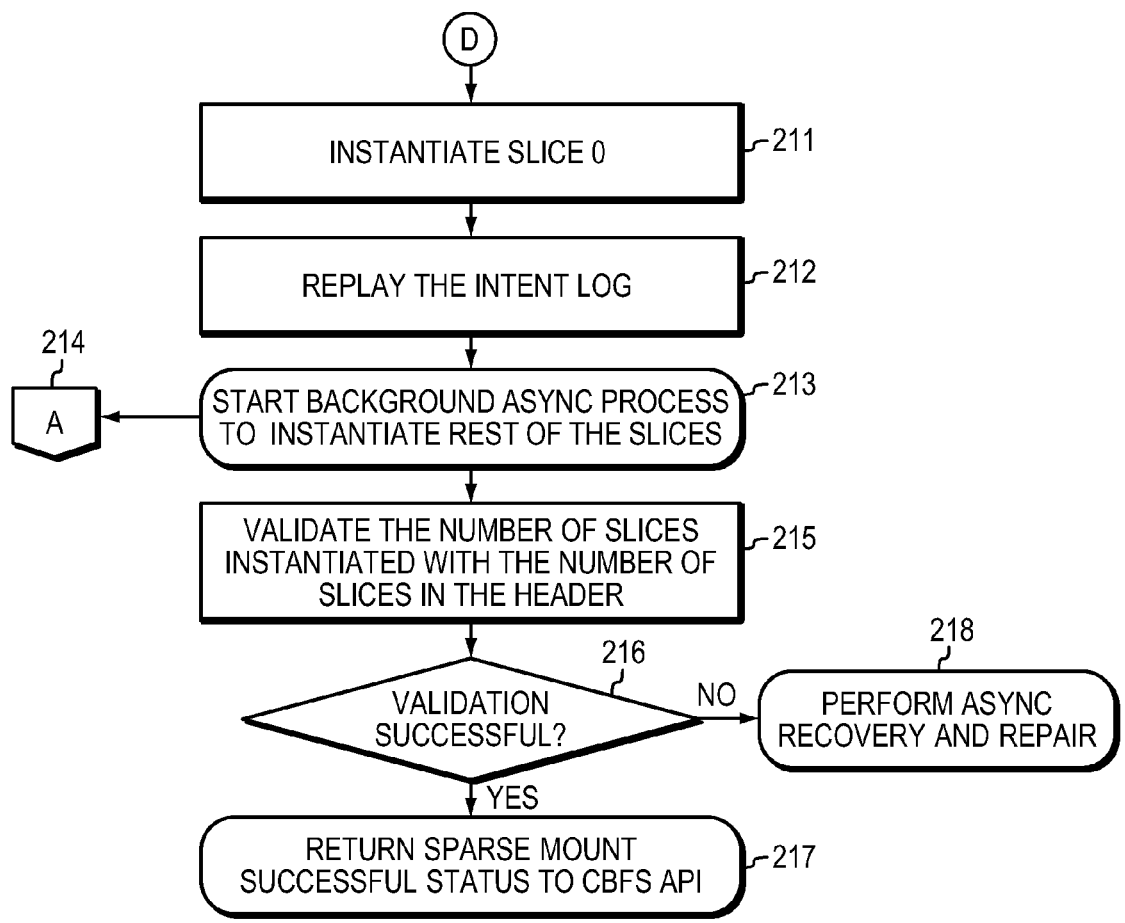

FIGS. 9A and 9B shows the process of mounting a sparse volume. In step 200, sparse volume mount request is received. The mount process reads the root slice volume of the sparse volume in step 201. In step 202, the magic field contained in the header of the root slice volume is validated to ensure if the slice volume is a root slice volume. If the root slice volume is correct, it is instantiated in step 204. If the content of the header does not indicate the slice volume as a root slice volume, mount process returns the failure status to a user in step 203. As part of the instantiation of the root slice volume, ID of the file system and metadata of the sparse volume is validated. After the validation, process proceeds to step 205 and validation result are checked for success. If the validation fails in step 205, the sparse volume is marked as inconsistent and mounts process fails in step 206. Repair process reconstructs the inconsistent volume. Mount process proceeds to step 207 if the metadata validation succeeds. In step 207, root slice is instantiated. Then validation of slice-0 metadata is performed in step 208. If the validation fails in step 209, the sparse volume is marked as inconsistent and mounts process fails in step 210. Repair process reconstructs the inconsistent volume. Mount process proceeds to step 211 shown in FIG. 9B through connector step D if the metadata validation succeeds. In step 211, slice-0 is instantiated. Mount process then checks for intent log in step 212, where on finding an entry indicating an incomplete operation, redo the transaction indicating the previous metadata update to the sparse volume that was interrupted by a system restart. Mount process then proceeds to step 213, where background asynchronous recovery process starts to instantiate all the other provisioned slices of the sparse volume. Connecting step 214 labeled "A" connects with the identically numbered and labeled step on FIG. 10-A. In step 215, at the end of the asynchronous recovery process, the number of slices provisioned under the sparse volume in step 214 is validated against the total number of provisioned slices contained in the root slice header. In step 216, if the validation fails, the sparse volume is marked as inconsistent and mounts process fails in step 218. Repair process reconstructs the inconsistent volume. If the validation in step 216 succeeds, the mount process then returns successful status and the sparse volume is mounted in step 217. At this point, a client of a file system built on the sparse volume can access the file system and can issue read or write requests.

Figure 10A:
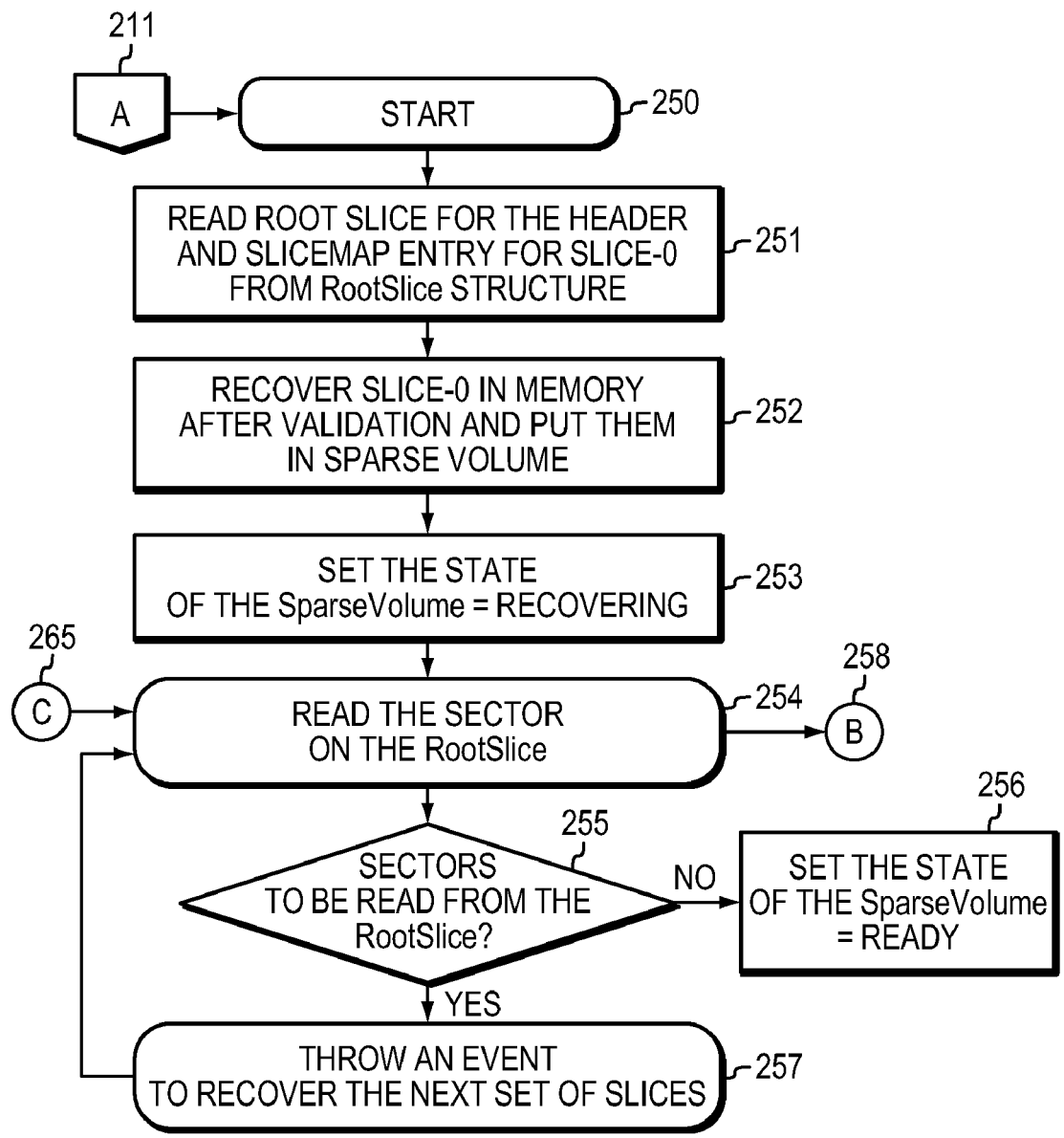
FIGS. 10A and 10B are a flow logic diagrams illustrating a method of asynchronously recovering a sparse volume during mount of the sparse volume shown in FIG. 3.
Figure 10B:
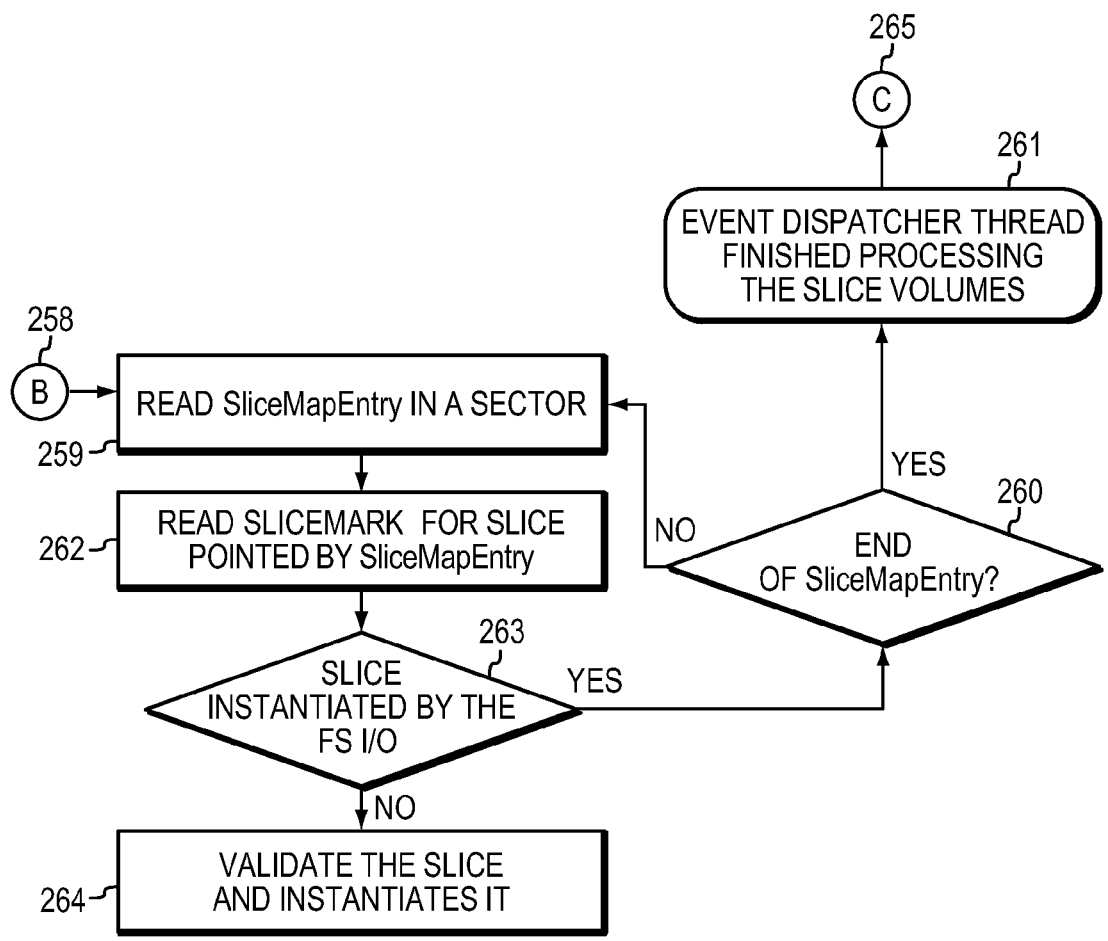

FIG. 10-A and 10-B illustrates the asynchronous recovery process initiated to instantiate the slice volumes in step 214 on FIG. 9B. Recovery process 250 reads the header of the root slice and the SliceMap entry for the slice-0 in step 251. Slice-0 is validated and recovered in memory. Pointer reference to the slice-0 is added to the in-core memory data structure representing the sparse volume. In step 252, asynchronous mount operation is instantiated to recover rest of the slice volumes. State of the sparse volume is set to "Recovering" in step 253. The root slice includes plurality of sectors that are processed one after another. In step 254, recovery process reads the first sector on the root slice and retrieves a plurality of SliceMapEntry included in that sector. Each SliceMapEntry in the sector represents the slice volume provisioned under the sparse volume. There could be up to 8 SliceMapEntry in a given sector. All the SliceMapEntry are instantiated by a separate asynchronous service thread represented by connecting step 258 labeled "B" that connects with the identically numbered and labeled step on FIG. 9. The asynchronous service thread starting at step 258, reads the SliceMap entry in the sector in step 259. In step 262, asynchronous service thread reads the SliceMark field of the slice volume represented by that SliceMapEntry. The SliceMark keeps track of the state of the slice volume and indicates if it is instantiated. The slice volume could be instantiated as part of the asynchronous recovery process. The slice volume could also be instantiated when a client of the file system issues an I/O request and before servicing the I/O request, the un-instantiated slice volume is recovered and instantiated. In step 263, the service process checks the state of the slice volume to find out if it has been instantiated previously as part of servicing an I/O request. If the slice volume has been instantiated, the asynchronous service thread skips the instantiation of that slice volume and proceeds to step 259 to read the next SliceMapEntry. If the slice volume has not been instantiated in step 263, the slice volume is validated and instantiated in step 264. The asynchronous service thread performs the steps 262, 263, 264 for all the SliceMapEntry included in the sector till we reach the end of SliceMap entries checked in step 260. After all the SliceMapEntry included in one sector are recovered by a asynchronous service thread in step 261, the asynchronous recovery process proceeds to step 265 to read next sector on the root slice volume and instantiates the slice volumes represented by the SliceMapEntry included in the sector by repeating the steps of asynchronous service thread starting at step 258. The asynchronous service thread starting at step 258 could instantiates multiple slice volumes at the same time by creating multiple threads in parallel to recover each slice volume. In step 255, the asynchronous recovery process checks if there are any more sectors to be read in the root slice. If all the sectors has been read, then the sparse volume's state is set to "Ready" in step 256 and the sparse volume can be managed and accessed by the user. If all the sectors are not read from the root slice, then process starts a background thread in step 257 to recover the next set of sectors. The layout of the SliceMapEntry is in the form of an array and every SliceMapEntry includes an index that point to the next provisioned slice volume. This layout enables the asynchronous recovery process to quickly instantiate all the slice volumes provisioned under a sparse volume.

Figure 11:
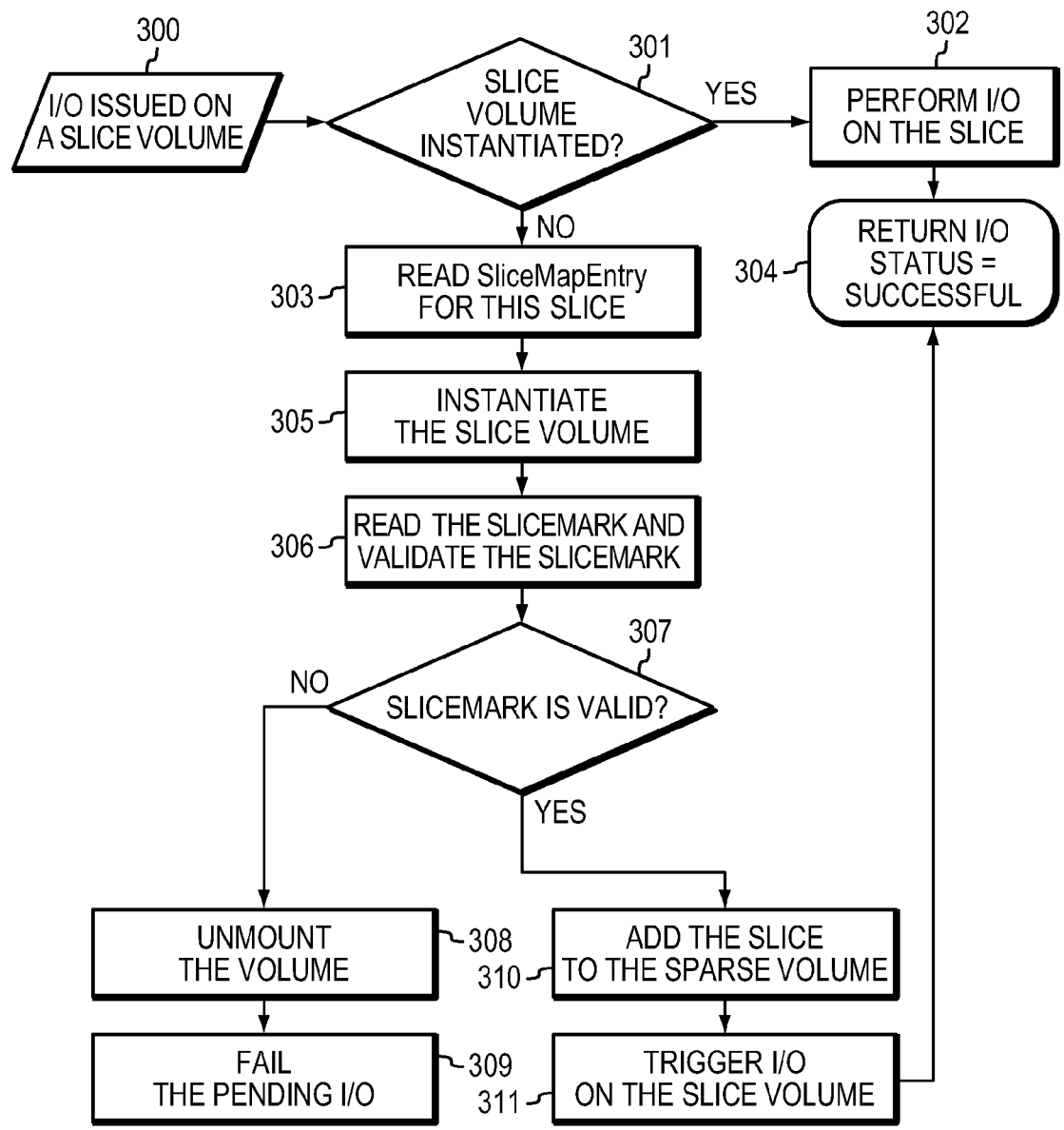
FIG. 11 shows additional method steps for handling I/Os received from clients during asynchronous recovery of a sparse volume shown in the FIG. 10A and FIG. 10B.

FIG. 11 shows how an I/O request would be handled when received during the asynchronous recovery process illustrated in FIGS. 9A and 9B above. In step 300, a client issues an I/O request on a slice volume. The process servicing the I/O request checks if the slice volume has been instantiated in step 301. If the slice volume has been instantiated by the asynchronous recovery process, then in step 302 I/O is performed on the slice volume. In step 304, the process returns the successful status back to the client. If the slice volume has not been yet instantiated, the I/O service process starts reading the SliceMap entry for that slice volume in step 303 and returns "IO pending" status to the client. In step 305, the slice volume is instantiated. The process validates the SliceMark field of the slice volume in step 306. Process then checks the results of the validation in step 307. If the SliceMark field is valid, pointer reference to the slice volume is added to the sparse volume in step 310. The service process then triggers the original IO on the newly instantiated slice volume in step 311 and returns the successful status to the client in step 304. If the SliceMark of the slice volume is invalid, the process marks the slice volume as inconsistent in step 308 and fails the pending I/O request issued by the client on the slice volume in step 309.

Figure 12:
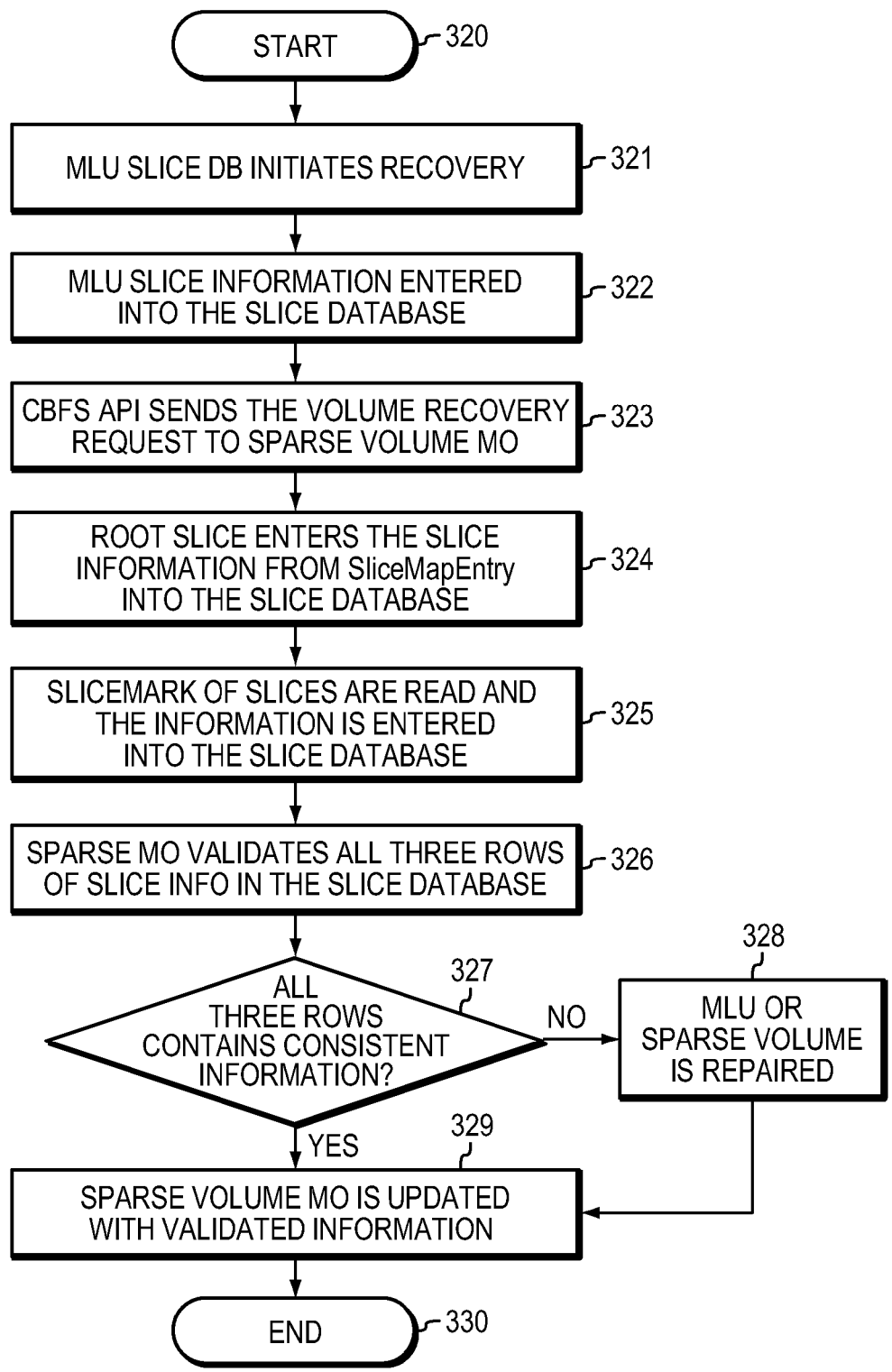
FIG. 12 is a flow logic diagram illustrating a method of reconstructing a sparse volume on finding the corruption during recovery of a sparse volume shown in FIG. 9.

The asynchronous recovery process illustrated in FIG. 10-A and 10-B and I/O servicing process illustrated in FIG. 11 above allows the clients of the file system to issue the I/O requests before a sparse volume is recovered completely. When validation for a slice volume or a sparse volume fails, the volume is marked as inconsistent and the repair process illustrated in FIG. 12 is invoked to reconstruct the volume. The recovery process to repair a sparse volume starts at step 320. MLU Slice database maintained on the data storage system initiates the recovery in step 321. Mapped LUN layer 31 shown in FIG. 1 retrieves the information of the slice volume and adds it to the in-memory slice database in step 322. In step 323, CBFS API Layer 33 shown in FIG. 1 sends the volume recovery request to sparse volume managed object 35 shown in FIG. 1. The root slice for the sparse volume then enters the slice metadata into the in-memory slice database in step 324. The SliceMark field of the slice volume is then read in step 325 and the metadata of that slice volume is added to the in-memory slice database. In step 326, the sparse volume managed object compares the metadata added to the slice database from three different sources in previous steps 322, 324 and 325 and checks if the metadata is consistent in step 327. If the metadata is consistent from all three sources, sparse volume managed object returns success in step 329, adds the metadata information in its data structure and ends the recovery in step 330. If the metadata in the slice database is inconsistent, slice database is repaired in step 328 or if metadata in sparse volume is inconsistent, the sparse volume is repaired. If the root slice is corrupted, the index field included in the SliceMark field of the slice volume is used to recover the sparse volume. The index of the SliceMark field holds the information about the next provisioned slice volume.

Mount process also checks the CRC at multiple levels to prevent the corruption of the slice volume and to detect the fault. Every SliceMapEntry in the root slice, every sector included in the root slice and root slice header includes the CRC. Inventors have also recognized that containing the fault to the lowest possible object would provide advantage to the user of the sparse volume and would considerably decrease the data-unavailability window to the user. This will also ensure that a data storage system or a file server is not made unavailable to the user in the event a corruption is detected on the sparse volume. If a slice volume cannot be instantiated, the sparse volume is marked as inconsistent. This limits the unavailability to only the file system built on top of this sparse volume. If there is an error on a slice volume, only the Slice volume is disabled and marked as inconsistent. The sparse volume including other healthy slices will continue serving the File System without any problem. Additionally, preferred invention includes a process that runs in the background and checks the integrity of the sparse volumes. If the process detects a fault in the sparse volume or the slice volumes provisioned under the sparse volume, the process marks the sparse volume as inconsistent to protect it from further damages.

A system and method has been described for recovering and reconstructing a sparse volume in a data storage environment using a new architecture. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

Figure 13:
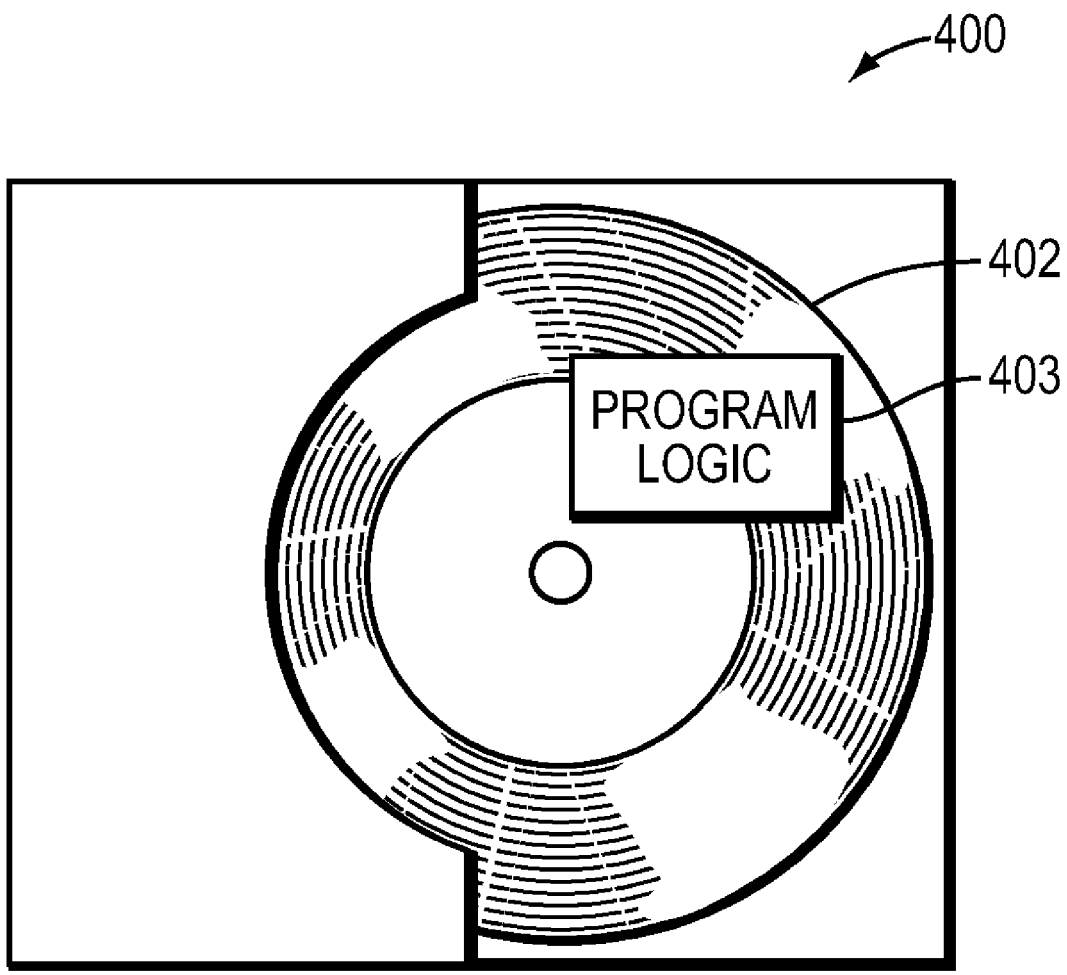
FIG. 13 shows a storage application for carrying out the methodology described herein and a computer medium including software described herein.

FIG. 13 shows the storage application 400 and Computer-readable medium 402 that includes program logic 403. Such a medium may be represented by any or all of those described at the beginning of this Detailed Description.

What is claimed is:

1. A method of recovering a sparse volume in a data storage environment, the environment including a data storage system and a file server, wherein the data storage system in communication with the file server provides disk storage to the file server for storing one or more file systems, and the file server accesses the disk storage through a sparse volume, wherein the sparse volume is a thin provisioned logical volume including a plurality of slice volumes, wherein each slice volume of the plurality of slice volumes is a logical representation of disk storage in the data storage system, the method comprising the steps of:

instantiating a root slice, wherein the root slice is a slice volume including a plurality of sectors, each sector of the plurality of sectors including an array of SliceMap entries, each SliceMap entry of the array of SliceMap entries indicating the slice volume provisioned under the sparse volume;

instantiating a slice-0 of a root slice volume, wherein the slice-0 represents a first slice of the plurality of slice volumes provisioned under the sparse volume; and invoking an asynchronous recovery program to instantiate other slice volumes of the plurality of slice volumes provisioned under the sparse volume than the slice-0 in the background unless the slice volume has already been instantiated by an I/O issued on the slice volume by a client of the file server.

2. The method of claim 1, wherein each SliceMap entry of the array of SliceMap entries included in the root slice volume contains an index to a next provisioned slice volume to be instantiated under the sparse volume.

3. The method of claim 1, wherein the root slice volume comprising:

a root slice header to contain metadata of the root slice volume, wherein a header includes a version to indicate a type of a slice volume and a count of provisioned slices under the sparse volume to validate a number of slices instantiated during the asynchronous recovery process;

a CRC entry to protect the integrity of contents of the root slice volume; and a SliceMark field to maintain consistency of the contents of the root slice volume.

4. The method of claim 1, wherein each sector of the plurality of sectors included in the root slice volume contains a sector CRC entry to protect the integrity of the SliceMap entries included in the sector.

5. The method of claim 1, wherein each SliceMap entry of the array of SliceMap entries included in the root slice volume contains a SliceMap CRC entry to protect the integrity of the slice volume indicated by each SliceMap entry.

6. The method of claim 1, wherein each slice volume of the plurality of slice volumes provisioned under the sparse volume contains a SliceMark field, wherein the SliceMark field includes a SliceMark CRC, metadata of the slice volume and an index to point to a next provisioned slice volume.

7. The method of claim 1, wherein the SliceMark, the root slice header and the SliceMap entry field containing metadata of the slice volume further includes a magic field to indicate if the slice volume is being used.

8. The method of claim 1, wherein the step of instantiating the root slice volume comprises the steps of reading and validating metadata information stored in the root slice header, validating the CRC entry of the header and reading the first SliceMap entry of the array of SliceMap entries included in the root slice volume.

9. The method of claim 1, wherein completing metadata updates to the sparse volume interrupted by a restart of a file server comprises the steps of:
   checking an intent log in the slice-0 of the root slice volume of the sparse volume, wherein the intent log is a transaction log storing every metadata updates to the sparse volume; and
   completing a metadata transaction on finding an entry in the intent log indicating the incomplete metadata update to the sparse volume.

10. The method of claim 1, wherein the step of instantiating each slice volume of the plurality of the slice volumes provisioned under the sparse volume comprises the steps of:
   reading the SliceMap entry field corresponding to the slice volume being instantiated; validating information stored in the SliceMap entry field;
   reading metadata information stored in the SliceMark field of the slice volume;
   validating the metadata information using the CRC entry of the SliceMark field of the slice volume; and
   adding the slice volume to the plurality of the slice volumes provisioned under the sparse volume indicated that the slice volume has been instantiated.

11. The method of claim 10, further including the step of, recording the information of the task of adding the slice volume to the sparse volume into the intent log of the root slice volume, wherein the task of adding a slice volume changes the metadata of the sparse volume and the slice volume.

12. The method of claim 1, wherein the asynchronous recovery program is a multithreaded program instantiating more than one slice volume of the plurality of slice volumes provisioned under the sparse volume at the same time.

13. The method of claim 12, wherein the asynchronous recovery program comprises the steps of:
   a) reading a sector on the root slice wherein the root slice includes a plurality of sectors, each sector of the plurality of sectors including a plurality of SliceMap entries;
   b) reading and validating the SliceMark for each slice volume referenced by the array of SliceMap entries included within the sector;
   c) instantiating the slice volumes referenced by the array of SliceMap entries included within the sector;
   repeating steps a-c until all sectors within the root slice are read and all slice volumes referenced by the array of SliceMap entries are recovered; and
   validating the number of slices instantiated in steps a-c with the number of slices contained in the root slice header.

14. A system for recovering a sparse volume in a data storage environment, the system comprising:
   a data storage system, wherein the data storage system in communication with a file server provides logical disk storage to the file server for storing one or more file systems;
   a file server, wherein the file server accesses the logical disk storage through a sparse volume, wherein the sparse volume is a thin provisioned logical volume including a plurality of slice volumes, wherein each slice volume of the plurality of slice volumes is a logical representation of disk storage in the data storage system; and
   a program logic in communication with the data storage system and the file server for carrying out the steps of:
   instantiating a root slice, wherein the root slice includes metadata of the plurality of slice volume provisioned under the sparse volume;
   instantiating a slice-0 of the root slice, wherein the slice-0 represents a first slice of the plurality of slice volumes provisioned under the sparse volume; and
   invoking an asynchronous recovery program to instantiate other slice volumes of the plurality of slice volumes provisioned under the sparse volume than the slice-0 in the background unless the slice volume has already been instantiated by an I/O issued on the slice volume by a client of the file server.

15. The system of claim 14, wherein the slice volume comprising:
   a root slice header to contain metadata of the root slice volume, wherein a header includes a version to indicate a type of a slice volume and a count of provisioned slices under the sparse volume to validate a number of slices instantiated during the asynchronous recovery process;
   a CRC entry to protect the integrity of contents of the root slice volume; and
   a SliceMark field to maintain consistency of the contents of the root slice volume.

16. The system of claim 14, wherein each SliceMap entry of the array of SliceMap entries included in the root slice volume contains a SliceMap CRC entry to protect the integrity of the slice volume indicated by each SliceMap entry.

17. The system of claim 14, wherein each slice volume of the plurality of slice volumes provisioned under the sparse volume contains a SliceMark field, wherein the SliceMark field includes a CRC, metadata of the slice volume and an index to point to a next provisioned slice volume.

18. A method of repairing a sparse volume on finding the file system or volume corruption in a data storage environment, the environment including a data storage system and a file server, wherein the data storage system in communication with the file server provides disk storage to the file server for storing one or more file systems, and the file server accesses the disk storage through a sparse volume, wherein the sparse volume is a thin provisioned logical volume including a plurality of slice volumes, wherein each slice volume of the plurality of slice volumes is a logical representation of disk storage in the data storage system, the method comprising the steps of:
   examining metadata information contained in a slice database, wherein the slice database includes metadata of each slice volume of the plurality of slice volumes provisioned under the sparse volume and is maintained by the data storage system;
   examining metadata information contained in a root slice, wherein the root slice includes array of SliceMap entries, each SliceMap entry of the array of SliceMap entries includes the metadata of each slice volume of the plurality of slice volumes provisioned under the sparse volume;
   examining metadata information contained in a SliceMark field of each slice volume of the plurality of slice volumes provisioned under the sparse volume, wherein the SliceMark field stores the metadata of the slice volume; and
   repairing a slice volume from the metadata information examined from the slice database, the root slice and the SliceMark field of the slice volume of the plurality of slice volumes provisioned under the sparse volume.

19. The method of claim 18, where in the step of repairing a slice volume further comprises the steps of:
creating a slice table, wherein the slice table is in-memory representation of the metadata of the slice volume examined from the slice database, the root slice and the SliceMark field of the slice volume;
examining the metadata added in the slice table for metadata integrity; and
reconstructing the slice volume from the information included in the slice table.

20. A system for repairing a sparse volume in a data storage environment, the system comprising:
a data storage system, wherein the data storage system in communication with a file server provides logical disk storage to the file server for storing one or more file systems;
a file server, wherein the file server accesses the logical disk storage through a sparse volume, wherein the sparse volume is a thin provisioned logical volume including a plurality of slice volumes, wherein each slice volume of the plurality of slice volumes is a logical representation of disk storage in the data storage system; and
a program logic in communication with the data storage system and the file server for carrying out the steps of:
examining metadata information contained in a slice database, wherein the slice database includes metadata of each slice volume of the plurality of slice volumes provisioned under the sparse volume and is maintained by the data storage system;
examining metadata information contained in a root slice, wherein the root slice includes array of SliceMap entries, each SliceMap entry of the array of SliceMap entries includes metadata of each slice volume of the plurality of slice volumes provisioned under the sparse volume;
examining metadata information contained in a SliceMark field of each slice volume of the plurality of slice volumes provisioned under the sparse volume, wherein the SliceMark field stores metadata of the slice volume; and
repairing a slice volume from the metadata information examined from the slice database, the root slice and the SliceMark field of the slice volume of the plurality of slice volumes provisioned under the sparse volume.

21. A program product for recovering a sparse volume, the program product operating in a data storage environment that includes a data storage system in communication with a file server providing logical disk storage to the file server for storing one or more file systems and a sparse volume including a plurality of slice volumes such that each slice volume of the plurality of slice volumes logically represent disk storage in the data storage system, wherein the program product includes computer-executable logic encoded on a computer-readable medium for executing the following steps:
instantiating a root slice, wherein the root slice includes metadata of the plurality of slice volumes provisioned under the sparse volume;
instantiating a slice-0 of the root slice, wherein the slice-0 represents a first slice of the plurality of slice volumes provisioned under the sparse volume; and
invoking an asynchronous recovery program to instantiate other slice volumes of the plurality of slice volumes provisioned under the sparse volume than the slice-0 in the background unless the slice volume has already been instantiated by an I/O issued on the slice volume by a client of the file server.

* * * * *